Feb. 6, 1923.
J. BERGE.
FLEXIBLE DRIVING SHAFT.
FILED OCT. 10, 1919.
1,444,231.
2 SHEETS—SHEET 2.
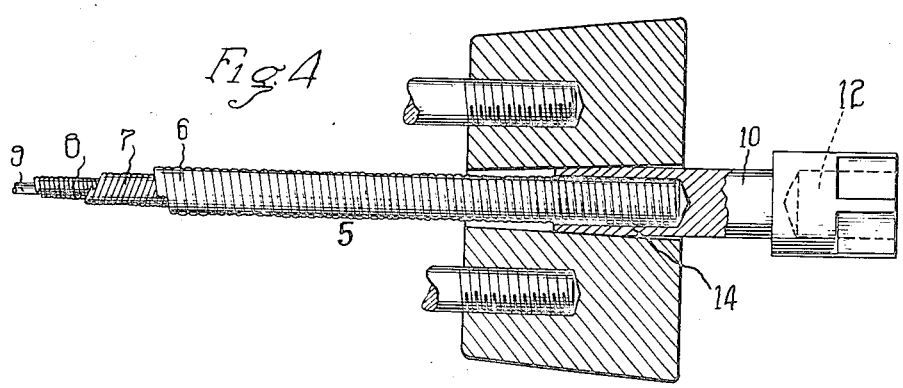
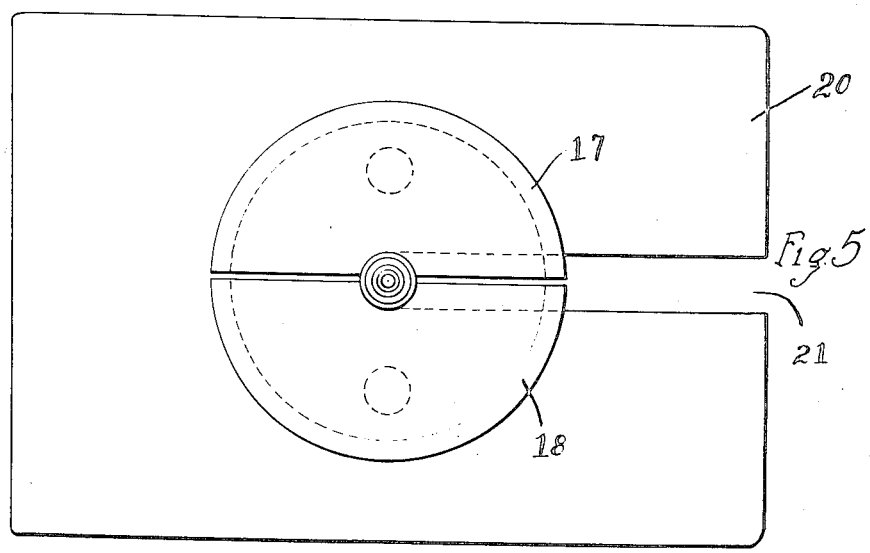
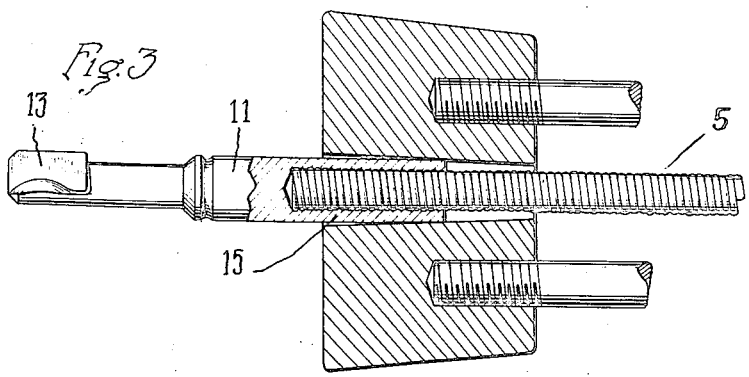
Witness:
Inventor
Joseph Berge
By Attorneys Patented Feb. 6, 1923.

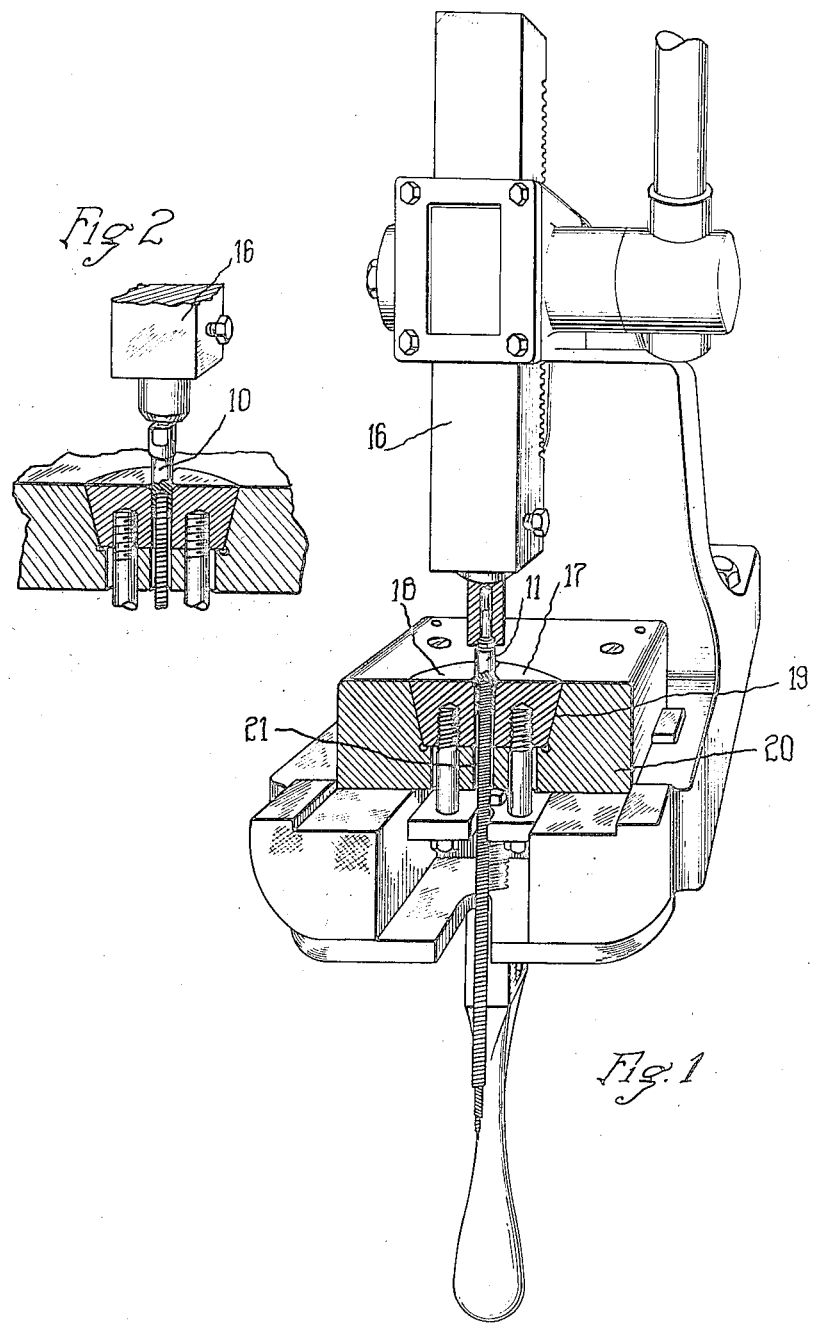

1,444,231

UNITED STATES PATENT OFFICE.

JOSEPH BERGE, OF FLINT, MICHIGAN, ASSIGNOR TO A C SPARK PLUG COMPANY, OF FLINT, MICHIGAN, A CORPORATION OF MICHIGAN.

FLEXIBLE DRIVING SHAFT.

Application filed October 10, 1919. Serial No. 329,657.

*To all whom it may concern:*

Be it known that I, JOSEPH BERGE, a citizen of the United States, and a resident of Flint, county of Genesee, and State of Michigan, have invented certain new and useful Improvements in Flexible Driving Shafts, of which the following is a full, clear, concise, and exact description, such as will enable others skilled in the art to which the invention relates to make and use the same, reference being made therein to the accompanying drawings, which form a part of this specification.

My invention relates to flexible driving shafts designed particularly for use in connection with automobiles and similar self propelled vehicles, for driving the speedometer with which such vehicles are commonly equipped from a wheel of the vehicle, the driving shaft, or other rotating element or part of the power system of the vehicle; and the object thereof is to provide certain new and useful improvements in and relating to the coupling members at the ends of the shaft whereby and through which the same may be connected with a rotating element and with a speedometer or other instrument to be driven in a ready and convenient manner, and in such a manner that the said ends may be readily disconnected from and reconnected with the driving and driven elements of parts aforesaid, as may be necessary in actual practice.

The object of my invention more definitely expressed is to provide an improved method or plan for securing the coupling members to the shaft proper in a convenient and expeditious manner, and in such a way as to secure a firm and permanent joint between the parts; and my invention is regarded as including both the flexible shaft having coupling members secured to the ends thereof in the manner hereinafter particularly explained, as well also as the method or process of securing the couplings in question to the ends of the shaft.

Referring now to the drawings:

Figure 1 is a view for the most part in perspective showing one of various machines or devices which may be used in securing coupling members to the ends of a flexible driving shaft in accordance with my invention.

Figure 2 is a fragmentary view showing a modification of the machine employed in Figure 1 used to attach a coupling of another form than that illustrated in Figure 1 to the end of the shaft.

Figure 3 is a view upon a larger scale and illustrating the manner in which the coupling shown in Figure 1 is secured to one end of the shaft.

Figure 4 is a similar view applying to the form of coupling member shown in Figure 2, and which coupling member is secured to the other end of the shaft.

Figure 5 is a view showing a section of a coupling and the shaft upon the same enlarged scale as in Figures 3 and 4 just above the dies employed in securing the coupling in place, with the dies just below said plane in plan.

The flexible portion or shaft proper is shown as made up of a plurality of superposed layers or coils of piano wire 6, 7 and 8 wound upon a central wire core 9 and upon one another in opposite directions, as shown, thereby providing an extremely flexible shaft and one of great strength as compared with its diameter.

Secured to the free ends of the shaft proper are two coupling members 10, 11, one of which is provided with a squared recess 12 adapted to receive the squared end of the driving shaft of a speedometer or other instrument to be driven, while the other of said members is provided with a driving key 13 adapted to enter a groove in the side of a recess provided in a driving shaft from which the instrument in question is driven. The form of the terminals, however, is in no way involved in this present case; and they may be of any suitable form, may be alike, or dissimilar, without in any way varying my invention so far as regards the essential and distinguishing features thereof.

The coupling members 10, 11 are provided with hollow tubular portions 14, 15 into which the ends of the flexible shaft 5 extend, the diameter of the shaft corresponding, approximately, with the diameter of the passage or recess provided for their reception in the coupling members.

In securing a coupling member, such as is above referred to, or its equivalent, to the shaft proper the end of the shaft is inserted into the passages in the said member, after which the wall of the hollow tubular portion is forced into firm and binding engagement with the exterior of the shaft, thus providing a secure and permanent joint or connection between the end of the shaft and the hollow tubular coupling member into which the said end extends.

Various machines may be employed for forcing the peripheral wall of the tubular portion of the shaft terminal into binding engagement with the shaft proper. For example, Figure 1 shows a press having a reciprocating ram 16, the lower end of which is so shaped as to effectively act upon the driving members to be fastened to the shaft, and 17, 18 designate two dies separable from one another and having registering recesses which together provide a slightly tapering passage into which the coupling member having a shaft end in place within its hollow tubular portion may be forced, see Figures 3 and 4; during which movement the side wall of the hollow end portion of the terminal will be contracted and forced into firm and permanent engagement with the peripheral surface of the end of the shaft, the forcing action being progressive, and greatest at the lower or inner end of the coupling member which has obviously been in engagement with the smaller, or part of least diameter, of the tapering recess into which the tubular end thereof was forced.

In order to provide for the convenient removal of the driving shaft with its attached end or coupling member from the dies 17, 18 said dies are made conical in form, and fit within a conical recess or seat 19 provided in a die supporting block 20 supported by the frame of the press, and which block has an opening 21 extending inward from one side thereof, see Figure 5; from which it follows that upward movement of the dies after a shaft terminal has been attached to an end of the shaft, as hereinbefore explained, will permit the dies to be separated laterally, and the shaft to be removed from between the dies through the slot or opening 21. As hereinbefore stated, however, the invention to which this present case relates is in no way limited to the use of a press or equivalent attaching means of any particular construction or mode of operation except that it must be one capable of and adapted to compress the side wall of the tubular portion of the coupling member into binding engagement with the peripheral surface of the end of the shaft, and attaching devices other than those illustrated and herein referred to may be used without in any way departing from my invention or varying the scope thereof.

It will be appreciated that the exterior surface of the flexible driving shaft is quite rough, due to its formation from superposed coils of steel wire, as explained, and that the slight taper formation of the passage in the dies 17, 18 results in the forcing of the wall of the tubular socket of the coupling member into engagement with the shaft with great force. In fact the material of the coupling member, which is appreciably softer than that of the shaft itself, is ordinarily pressed in between the corrugations of the shaft, thus providing a joint which, in addition to being adequately strong to transmit the torsional forces met with, effectively prevents the terminals from being pulled off from or becoming loose upon the end of the shaft when the same is in use.

Having thus described and explained my invention, I claim and desire to secure by Letters Patent:

1. The method of securing a coupling member having a hollow tubular portion at one end thereof to a flexible metallic shaft which consists in inserting an end of the shaft into the passage in the tubular portion of the coupling member to be secured thereto, and forcing the peripheral wall of said tubular portion into binding engagement with said shaft progressively from the open toward the closed end of said tubular portion.

2. In combination, a flexible metallic shaft comprising a plurality of superposed layers of wire coiled about a central core, and a metallic coupling member having a tubular portion into which an end of the shaft extends; the peripheral wall of said tubular portion being forced inward and into binding engagement with the exterior surface of said shaft.

3. In combination, a flexible metallic shaft comprising a plurality of superposed layers of wire coiled about a central core, and a metallic coupling member having a tubular portion into which an end of the shaft extends; the peripheral wall of said tubular portion being forced inward and into binding engagement with the exterior surface of said shaft progressively from the open end thereof toward the closed end or bottom of the tubular portion aforesaid.

4. The method of securing a coupling member having a hollow tubular portion at one end thereof to a flexible coiled wire shaft which consists in inserting an end of the shaft into the passage in the tubular portion of the coupling member to be secured thereto, and forcing said coupling member and shaft longitudinally of a tapering opening provided in a suitable die, to thereby force the tubular portion of said member into binding engagement with said shaft progressively from the open toward the closed end of said tubular portion.

In testimony whereof I affix my signature.

JOSEPH BERGE.